United States Patent [19]

Rybicki

[11] 3,853,426
[45] Dec. 10, 1974

[54] ELASTOMERIC HELICOPTER ROTOR HEAD WITH DYNAMIC AND STATIC BLADE CONING AND DROOP STOPS

[75] Inventor: Robert C. Rybicki, Trumbull, Conn.
[73] Assignee: United Aircraft Corporation, East Hartford, Conn.
[22] Filed: Aug. 29, 1973
[21] Appl. No.: 392,825

Related U.S. Application Data
[63] Continuation-in-part of Ser. No. 286,508, Sept. 5, 1972, abandoned.

[52] U.S. Cl.................. 416/140, 416/134, 416/141
[51] Int. Cl. ........................................... B64c 27/38
[58] Field of Search ........... 416/140, 144, 134, 106, 416/107

[56] References Cited
UNITED STATES PATENTS

| 3,310,119 | 3/1967 | Watson | 416/141 UX |
|---|---|---|---|
| 3,501,250 | 3/1970 | Mosinskis | 416/141 X |
| 3,533,713 | 10/1970 | Salmin | 416/140 X |
| 3,556,673 | 1/1971 | Killian | 416/141 X |
| 3,591,310 | 7/1971 | Mouille | 416/141 X |
| 3,679,322 | 7/1922 | Mouille | 416/141 |
| 3,700,352 | 10/1972 | Gorndt | 416/141 X |

Primary Examiner—Everette A. Powell, Jr.
Attorney, Agent, or Firm—Vernon F. Hauschild

[57] ABSTRACT

An elastomeric helicopter rotor having a blade mounted by means of an elastomeric bearing for universal motion about the intersection of the blade pitch change, flapping and lead-lag axes and including blade coning and droop stops, including a conical ring member rotatably mounted about the pitch change axis of the blade and coning and droop stops constituting circular segments of conical members whose centers lie on the blade lead-lag axes and with the ring member and coning stop and droop stop members presenting mating surfaces to one another so that as the blade moves in lead-lag motion while the blade ring member is in contact with either the coning stop surface or the droop stop surfaces, a relative motion will be established therebetween for full support of the blade throughout the lead-lag motion, without affecting blade pitch angle or flapping angle, without preventing independent blade pitch change and without scuffing of parts. Most importantly, the droop stops are both a dynamic droop stop supported from the hub for limiting blade droop during flight, and a static droop stop supported loosely from and pivotable on said dynamic droop stop, for further limiting blade droop at low rotor speeds or at rotor rest, so that blade loading against said static droop stop will move said static droop stop into engagement with said dynamic droop stop to impart said load directly through both droop stops so engaged into the hub. The loose pivot between the static and dynamic droop stops involves substantial diametral clearance providing for almost frictionless operation of the static droop stop, and causing the blade load to bypass the pivot connection. The looseness of the pivot connection and the shape of the static droop stop will accommodate misalignment between the contacting surfaces. This misalignment, which is allowed by the flexibility of the blade supporting elastomeric bearing, will cause the static droop stop to rotate on the dynamic droop stop and realign itself under load, and provide proper contact rather than corner loading.

30 Claims, 9 Drawing Figures

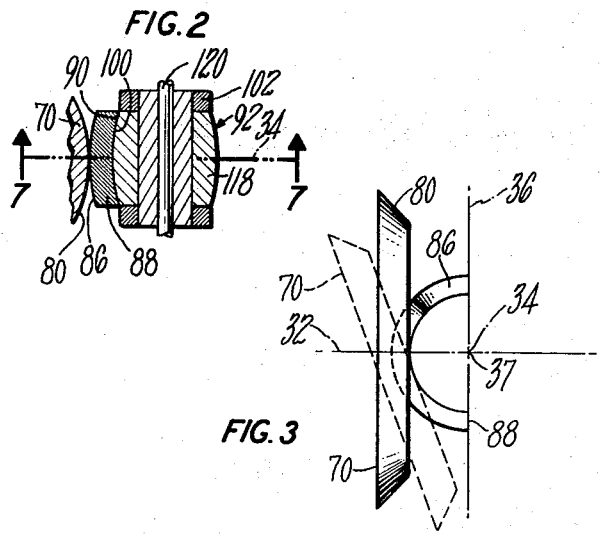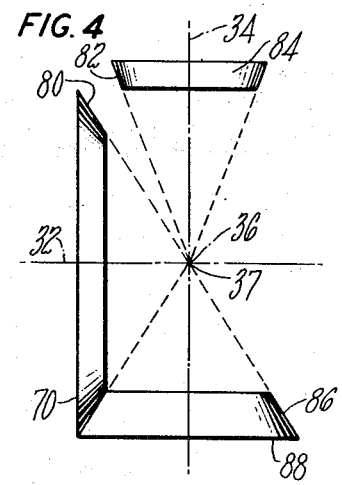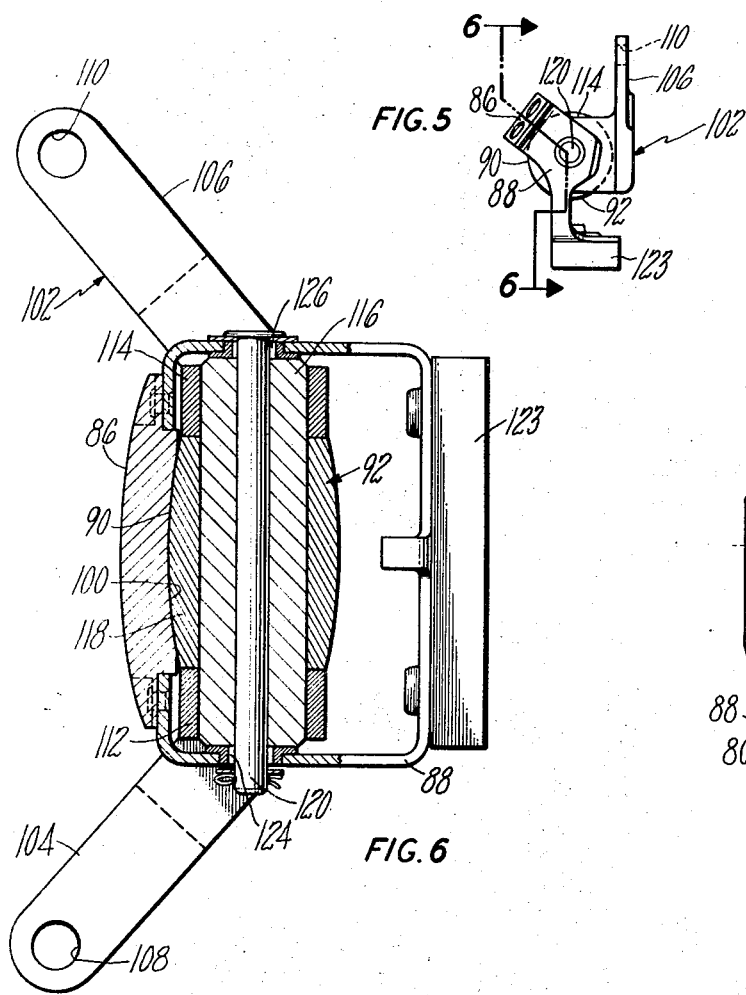

ELASTOMERIC HELICOPTER ROTOR HEAD WITH DYNAMIC AND STATIC BLADE CONING AND DROOP STOPS

This is a continuation-in-part application of parent case U.S. Ser. No. 286,508 filed Sept. 5, 1972, now abandoned and entitled ELASTOMERIC HELICOPTER ROTOR HEAD WITH DYNAMIC AND STATIC BLADE CONING AND DROOP STOPS, all of the subject matter thereof being incorporated herein by reference.

CROSS-REFERENCE TO RELATED APPLICATION

Subject matter shown and described in this application is shown, described and claimed in a copending application, Ser. No. 286,509, entitled "Elastomeric Helicopter Rotor Head with Dynamic and Static Blade Coning and Droop Stops" by Donald L. Ferris filed on even date with parent application Ser. No. 286,508.

BACKGROUND OF THE INVENTION

1. Field of the Invention

This invention relates to droop and coning limit stops for use in helicopter rotors and more particularly for use in such rotors in which the blade is mounted from the hub by mechanism, such as a spherical elastomeric bearing, for universal motion about the intersection of the blade pitch change, lead-lag and flapping axes. In particular, to such a droop stop and coning limit mechanism in which rolling motion over mating abutting surfaces exists as the blade moves in lead-lag motion when the blade is in either limit position, and wherein the droop stop is connected to the hub and includes both a dynamic and a static droop stop, with the static droop stop being loosely supported from and pivotable on the dynamic droop stop so that blade loading against said dynamic droop stop will be imparted therethrough directly to said hub and so that blade loading against said static droop stop will cause motion of said static droop stop into engagement with said dynamic droop stop to be imparted therethrough into said hub, bypassing the pivot connection, and wherein the droop stop can accommodate misalignment due to elastic deflections of the spherical elastomeric bearing.

2. Description of the Prior Art

In the droop stop art, provisions have not been made for coning limit and droop stop means for a blade which is universally mounted, since blades have not been conventionally so mounted in the prior art articulated helicopter rotor art. In the past, articulated rotor blades have been mounted for rotation about selected axes, as opposed to universal mounting about a point.

In conventional droop stop art, such as U.S. Pat. Nos. 2,614,640; 2,628,686; 2,719,593 and 2,906,348, there are no spherical, conical or rolling surfaces to limit the universal motion of a blade from a hub.

Kisovec U.S. Pat. No. 3,282,350 teaches droop and coning stops for use with elastomeric helicopter rotors, but these stops are of the flat pad design which do not provide the advantages of the construction taught herein. This patent does not provide constant coning or droop angle limitation throughout the lead-lag range, does not provide rolling contact between the blade and its limit stops, nor does it have misalignment capability, nor the ability to permit normal pitch change motion of the blade. When cone 60 of this patent is engaged, the blade is locked in pitch, lead-lag and flapping motion.

Mosinskis U.S. Pat. No. 3,501,250 teaches an articulated helicopter rotor with an elastomeric bearing mounting and with a droop stop, but of the flat pad and cylindrical roller variety. This construction does not provide for movable stops, i.e., static and dynamic coning and droop stops, which limit static blade motions more than dynamic in-flight blade flapping motions. Furthermore, the cylindrically shaped roller does not permit true rolling contact on the conical surface, in fact, the roller will skid. Neither is there any provision for accommodating misalignment due to elastomeric bearing deflections. The cylindrical roller will skid, as opposed to producing rolling contact, since the roller must be conical to produce true rolling contact and the apex of the conical roller must be at the intersection of the lead-lag and flapping axes of the blade and such would not be the case in this patent even if the roller were considered to be conical. Flat pad designs are limited to satisfy one single specific degree of lead or lag at one particular degree of coning. Beyond this specific degree of lead or lag, contact of the stops results in a lesser degree of the required coning angle and high wear on the mating surfaces due to point or corner contact of the stops. To satisfy two different degrees of angular droop, static and dynamic, the roller must be conical with its apex coincident with the center of the centering device, and the mating stop must also be conical with its apex coincident with the center of the centering device. In addition, the mating stop surfaces must be concentric with the lead-lag axis in order to maintain an identical static and dynamic droop angle through all phases of lead-lag motion.

In the prior art, there are no provisions for mounting a static droop stop loosely from and pivotable on a dynamic droop stop so that blade loading thereagainst will cause said static droop stop to move into contact with said hub mounted dynamic droop stop to impart blade loading therethrough to said hub, while bypassing the loose pivot connection. This relative motion between the static droop stop and the dynamic droop stop also permits centrifugal force to cause the static droop stop to rotate out of its operative position and free of said dynamic droop stop in frictionless fashion in response to the increasing centrifugal force generated by increasing rotor speed. Said relative motion between the static and dynamic droop stops also permits perfect alignment of the rolling surfaces to accommodate any misalignment therebetween.

SUMMARY OF THE INVENTION

A primary object of the present invention is to provide a droop stop and a coning limit stop for a universally mounted helicopter blade in an articulated rotor wherein the blade is able to move in led-lag motion without variation in droop or coning angle without parts scuffing, without inducing pitch change motion, and while permitting independent blade pitch change motion, when the blade is at either its maximum limit coning angle or its maximum droop angle, by the use of coning limit and droop stops which are positioned to intercept and rotatably mate with a ring member mounted for rotation about the blade pitch change axis.

An important object of the present invention is to provide such a droop stop which is both a static droop stop and a dynamic droop stop and wherein the static droop stop is loosely, pivotally mounted from said dynamic droop stop so that blade loading thereagainst will cause the static droop stop to come into contact with the hub mounted dynamic droop stop to impart blade loading therethrough to the hub and, so that, with the blade out of engagement with the static droop stop, the static droop stop is centrifugal force responsive to rotate free of said dynamic droop stop in response to increased rotor speed.

In accordance with the present invention, when the blade is at either of its limit stops, lead-lag motion can take place without changing the angle of flapping.

In accordance with still a further object of the present invention, this permitted lead-lag motion at the limit stops occurs without scuffing between blade and hub mounted parts.

In accordance with a further aspect of the present invention, a centrifugally responsive mechanism is utilized with the dynamic droop stop to constitute a static droop stop when the blade is at low rotational speed operation or stopped and wherein the static droop stop is loosely pivoted on the hub mounted dynamic droop stop so that blade loading thereagainst will cause said static droop stop to contact said dynamic droop stop to impart blade loading therethrough to said hub while bypassing the pivot connection.

In accordance with the teaching herein, the blade mounted rotatable ring member, the coning limit stop, and the static droop stop have conically shaped surfaces whose apexes are positioned at the point of intersection of the blade pitch change, flapping and lead-lag axes. It may be considered that the coning limit stop and static droop stops are segments of conical rings which lie in a horizontal plane and are centered about the lead-lag axis and that the surfaces are shaped in cross section as segments of circles which lie in substantially horizontal planes and the centers of which lie on the lead-lag axis. Similarly, the conically shaped mating surface of the rotatable blade ring is concentric about the pitch change axis.

In accordance with still a further feature of this invention, the dynamic droop stop member is a barrel shaped member supported from the hub and oriented and shaped so that sections taken therethrough in planes perpendicular to the lead-lag axis will form segments of circles concentric with respect to the lead-lag axis. The surface of the static droop stop which bears against the dynamic droop stop is made, at least in part of similar and mating barrel shape so as to matingly engage the dynamic droop stop barrel in surface contact during static droop stop operation. Further, due to the loose pivot support connection between the static droop stop and the dynamic droop stop, if there is misalignment in the system, the static droop stop can pivot with respect to the dynamic droop stop to keep the barrel shaped surfaces of the static and dynamic droop stops in surface-to-surface contact and thereby keep the conical surfaces of the ring member and static droop stop in continuous alignment and full contact. The mating barrel shaped surfaces of the dyanamic and static droop stops also serve to lock the static droop stop in position between the dynamic droop stop and the ring member during static droop stop operation.

Other objects and advantages of the present invention may be seen by referring to the following description and claims, read in conjunction with the accompanying drawings.

BRIEF DESCRIPTION OF THE DRAWINGS

FIG. 2 is a view taken along line 2—2 of FIG. 1.

FIG. 3 is a schematic top view representation of the coaction between the static droop stop member and the blade mounted rotatable ring member.

FIG. 4 is a side view of the construction shown in FIG. 3 and with flapping or coning limit stop added.

FIG. 5 is a side view of the static and dynamic droop stop mechanism of FIG. 1.

FIG. 6 is a sectional view taken along line 6—6 of FIG. 5.

FIG. 7 is a section along line 7—7 of FIG. 2.

DESCRIPTION OF THE PREFERRED EMBODIMENT

Figure 1:
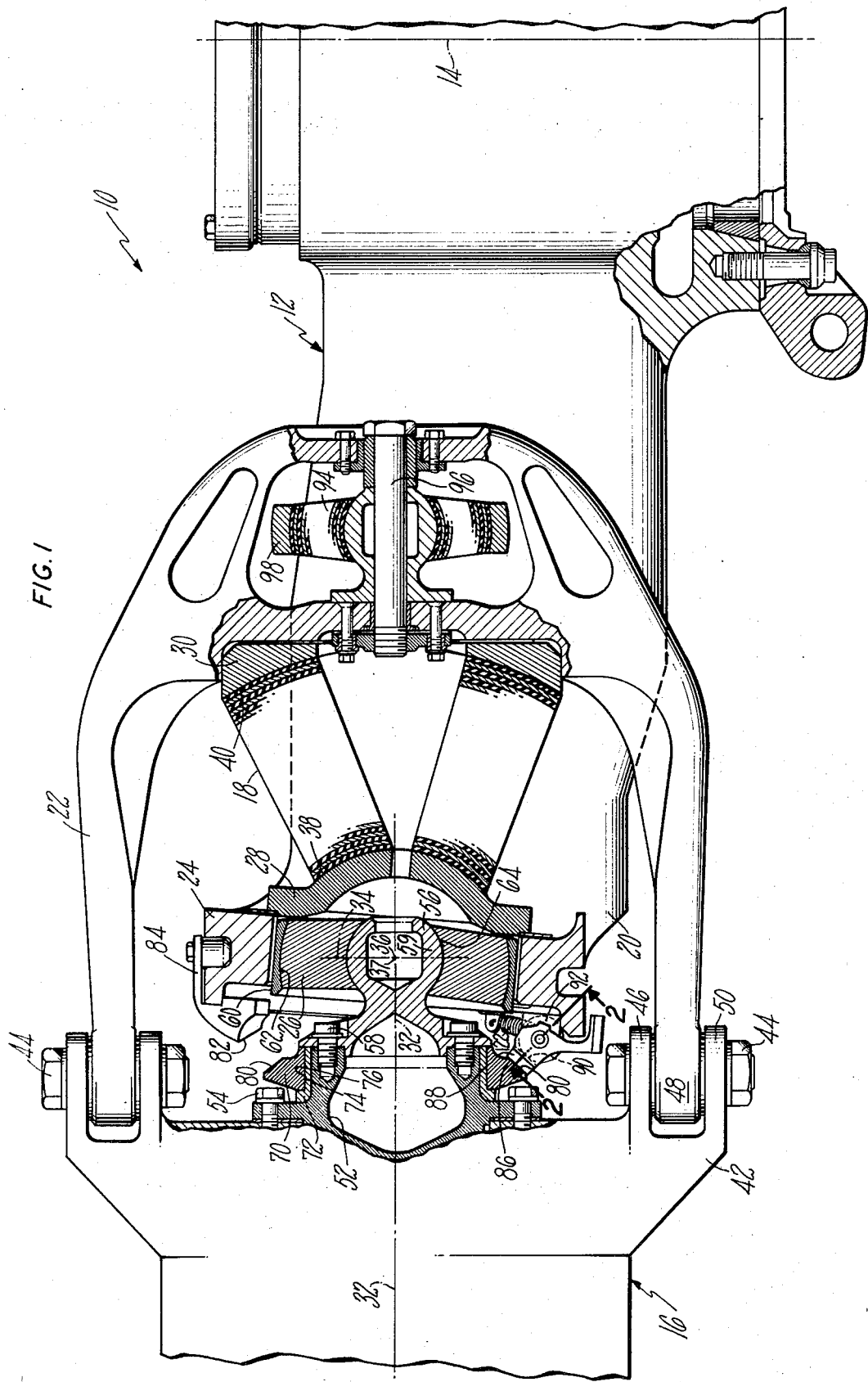
FIG. 1 is a partial side view of an articulated helicopter rotor, partially broken away for illustration, which shows the static and dynamic droop stops and the coning limit stop in an environment of an articulated helicopter rotor in which the blade is supported from the rotor hub by a spherical elastomeric bearing so as to be universally movable about the intersection of the blade pitch change, lead-lag and flapping axes.

Referring to FIG. 1 we see articulated helicopter 10 which comprises a rotor hub 12 mounted for rotation about axis of rotation 14. A plurality of blades, one of which is shown at 16, extend substantially radially from said hub and are mounted therefrom for rotation therewith about axis 14 to generate lift. Basically, the blade 16 is supported from hub 12 through spherical elastomeric bearing 18 for universal motion. Bearing 18 is mounted between hub supported yoke or loop member 20 and blade connected yoke or loop member 22, which yoke members interlock to position elastomeric spherical bearing 18 therebetween. More specifically, hub arm 24 is a portion of yoke member 20 and serves to support blade centering bearing 26 and the inner race 28 of spherical bearing 18. The outer race 30 of spherical bearing 18 is connected to blade yoke 22 so that blade 16 is supported from hub 12 through spherical elastomeric bearing 18 for universal motion about the intersection 37 of pitch change axis 32, lead-lag axis 34 and flapping axis 36.

Elastomeric bearing 18 perferably includes spaced spherical metallic laminates encased in elastomer and spherically centered about intersection 37, as are surfaces 38 and 40 of the bearing races. The laminates are joined to one another with the outer elastomer joined to surface 40 and the inner elastomer to surface 38. Bonding is the preferred method of joining.

Blade sleeve 42 connects to blade yoke member 22 through conventional nut and bolt members 44, which extend through the aligned holes in the overlapping flanges thereof, such as those shown at 46, 48 and 50. Stub shaft 52, which is concentric about pitch change axis 32, is connected to sleeve 42 by conventional bolt members 54 and, in turn, supports centering pin 56 which is also concentric about axis 32 and is shown to be shaped herein to define the inner race 59 of the spherical, elastomeric centering bearing 26. Bearing 26 is constructed similarly to bearing 18 and comprises alternate layers of elastomer and rigid laminates centered about axes point of intersection 37 and joined to one another and with the outer elastomeric laminate joined to bearing outer race 60 while the inner elastomeric laminate is joined to bearing inner race 59. Surfaces 62 and 64 of outer race 60 and inner race 59, respectively, are also centered about point 37.

It will be noted that with this construction, blade 16 is mounted from hub 12 through spherical elastomeric bearing 18 for universal motion about the intersection of the pitch change axis 32, the lead-lag axis 34 and the flapping axis 36.

Droop stop ring 70 is mounted for rotation about axis 32 on stub shaft 52 and is supported from the shaft by journal 72. Ring 70 is free to rotate with respect to stub shaft 52 because of the solid or dry lubricant or selective plating between ring surface 74 and journal surface 76. Surface 80 of ring 70 is of conical shape, to be described in greater particularity hereinafter, so that it will matingly engage surface 82 of coning limit stop member 84 when the blade is at its maximum permitted coning angle, and so that it will matingly engage surface 86 of static droop stop member 88 and surface 90 of dynamic droop stop 92. It is important that, when blade 16 is at its maximum coning angle, so that surface 80 is in contact with surface 82, the blade can move in lead-lag motion without scuffing and without pitch change or flapping motion, while permitting independent blade pitch change motion. This is accomplished by the rotation of ring 70 about pitch change axis 32 as the ring travels in rolling contact along surface 82. The same is true, when surface 80 is in contact with surfaces 86 or 90 of the droop stops, so that the blade 16 is permitted to move in lead-lag motion about axis 34 due to the rotation of ring 70 about axis 32 as it remains in rolling contact with and rotates with respect to surfaces 86 or 90.

A lead-lag damper, not shown but of the conventional hydraulic cylinder-piston type, connects the hub 12 to blade 16 through damper bearing 94, which is supported for universal motion about pin 96. Bearing outer race 98 is connected to the lead-lag damper.

Surfaces 82, 86 and 90 are shaped as circular segments of conical or barrel shaped members which lie in a substantially horizontal plane and which circular segments are centered on lead-lag axis 34. The cross-sectional shape of each is a circle segment concentric about lead-lag axis 34.

Dynamic droop stop member 92 and static droop stop member 88 will be described in greater particularity hereinafter.

FIG. 7 shows the wedge retention construction for the construction of the centrifugally actuated static droop stop member 88 wherein mating surfaces 86 and 80 are conical, and mating surfaces 90 and 100 are barrel shaped and concentric about axis 34 with surface-to-surface contact taking place between these mating surfaces. It should be borne in mind that surface-to-surface contact or line-to-line contact is preferable to edge or corner loading from a wear standpoint for rolling applications. When member 70 moves due to deflection of bearing 18 so that surfaces 80 and 86 are not in perfect alignment for full contact, the construction of the invention is capable of correcting this misalignment between the conical surfaces to reestablish full contact therebetween.

As shown in FIGS. 3 and 4, surfaces 80 and 86 of rotatable ring 70 and static droop stop 88, respectively, are shown as frustroconical in shape and as being portions of cones whose apexes intersect at the point of intersection 37 of axes 32, 34 and 36. This is best shown in FIG. 4. As best shown in FIG. 3, while frustoconical surface 80 of ring 70 and surface 86 of static droop stop 88 are in continuous rolling contact, ring 70 may rotate with respect to stop 88 as blade 16 moves in blade lead-lag motion about axis 34. This relative rotation occurs without changing the blade droop or flapping or pitch change. FIG. 3 shows ring 70 in two positions, in the solid line nonlag position and in the phantom lead or lag position. It will be noted by viewing FIGS. 3 and 4 that static droop stop 88 is at least a segment of a conical member lying horizontally or in a plane parallel to pitch change axis 32 and concentric about lead-lag axis 34. As best shown in FIG. 4, flapping stop limit member 84 is also at least a segment of a cone lying in a horizontal plane or in a plane parallel to pitch change axis 32 and concentric about lead-lag axis 34 and presents frustoconical surface 82 for contact with surface 80 or ring 70, which frustoconical surface 82 is formed from a cone whose apex is at the aforementioned point of intersection 37 between axes 32, 34 and 36. The advantage to be gained by this construction in which surfaces 82 and 86 are frustoconical with apexes positioned at point of intersection 37 and concentric about axis 34 and surface 80 of ring member 70 is also frustoconical with apex positioned at point of intersection 37 and concentric about lead-lag axis 32, when centered, is that pure, rolling, contact occurs continuously between surfaces 80 and 86 or 80 and 82, respectively, when blade is in its droop limit or flap limit position and moving in lead-lag motion, without varying blade pitch and without scuffing of mating parts.

Surfaces 80, 82 and 86 may be other than frustoconical but the pure rolling action would be lost. For example, surfaces 82 and 86 could be spherical and concentric about axes 32 or 34 and surface 80 could be of corresponding curvature.

Referring to FIGS. 2, 5 and 6, we see the structure of the dynamic and static droop stop in greater particularity. Dynamic droop stop 92 is supported from hub 12 by bracket member 102 which includes legs 104 and 106 which are connected in conventional fashion, such as the passing of bolts through apertures 108 and 110, and which also includes ear or ring members 112 and 114 projecting therefrom and enveloping the ends of central cylindrical member 116, which carries annularly or barrel shaped member 118 thereon between ear members 112 and 114. Dynamic stop 92, and particularly barrel 118, is oriented and shaped so that parallel planes passed therethrough perpendicular to blade lead-lag axis 34 will form segments of circles concentric with respect to axis 34. Surface 100 of static droop stop 88 is fabricated to be of barrel shape, at least in part, as shown in FIG. 7 so as to engage barrel shape member 118 in surface contact when in the static position. Surface 80 of ring 70 and surface 86 of the static droop stop 88 are conical with their apex at the common point 37 as best shown in FIG. 4. Members 116 and 118 can be integral and it is not necessary that member 118 rotate with respect to member 116. Thru-pin 120 passes through member 116 and loosely pivotably supports static droop stop member 88 therefrom. Accordingly, when blade 16 is rotating at a low rpm or is stopped, spring 122 (FIG. 1), which extends between hub 12 and static droop stop 88, pulls droop stop 88 into its FIG. 1, 2, 5 and 6 position so that conical surface 86 of static stop 88 is presented to ring conical surface 80 for mating contact engagement and is of corresponding curvature therewith as shown in FIGS. 3 and 4. When surfaces 80 and 86 contact, and the weight of blade 16 causes member 88 to move with respect to pin 120 and, therefore, barrel shaped surface 100 of static droop stop 88 comes into surface bearing engagement with barrel shaped surface 90 of dynamic droop stop 92, which is rigidly supported from hub 12. Due to the loose fit connections at 124 and 126 between static droop stop 88 and thru-pin 120, surfaces 90 and 100 remain in surface contact, as stop 88 rotates about pin 120 into a position of perfect alignment and full contact between surfaces 86 and 80. Accordingly, the weight or dynamic force of blade 16 contacting the static droop stop 88 is imparted through the static droop stop 88 to dynamic droop stop 92 and therefrom through bracket 102 to hub 12, bypassing completely pivot pin 120 so that pin 120 is not loaded thereby.

When the blade rpm increases sufficiently, counterweight 123 of static droop stop 88 is acted upon by centrifugal force and causes static droop stop 88 to rotate in a clockwise direction from the position shown in FIGS. 1 and 7 so as to bring surface 86 thereof to a position remote from surface 80 of ring 70, thereby permitting blade 16 to droop downwardly to a greater angle until surface 80 of ring 70 contacts surface 90 of dynamic droop stop 92. The droop loading of the blade passes through dynamic droop stop 92 and brackets 102 into the blade hub 12.

When utilizing the droop stop construction shown, mating surfaces 80, 86 and 82 are preferably frustoconical as shown in FIGS. 3 and 4. Further, in view of the shape of barrel 118, sections through which are concentric about axis 34, a continuous, rolling contact exists between surfaces 80 and 90.

It will accordingly be seen that blade 16 may droop or flap downwardly until surface 80 of rotatable ring 70 contacts either mating surface 86 or 90 of static or dynamic droop stops 88 and 92, respectively, and blade 16 can move freely in lead-lag motion without causing blade pitch change, while permitting independent blade pitch change, and while permitting the droop or downward flapping blade angle to remain constant, and without scuffing between the surfaces in contact, all due to the continuous full contact and rolling motion which exists between surface 80 of ring 70 and the corresponding mating surface 82 of flap limit stop 84, and the continuous full contact between surfaces 80 and 90. Blade 16 can move freely in lead-lag motion about axis 34 without affecting blade pitch, while permitting blade pitch change independently of blade lead-lag motion, and while permitting the upward flapping blade angle and the droop angle to remain constant, and without scuffing between the surfaces in contact, all due to the continuous contact and rolling motion which exists between surfaces 80 of ring 70 and the corresponding mating surface 82 of flap limit stop 84 and surfaces 86 and 90 on static droop stop 88 and dynamic droop stop 92.

Figure 8:
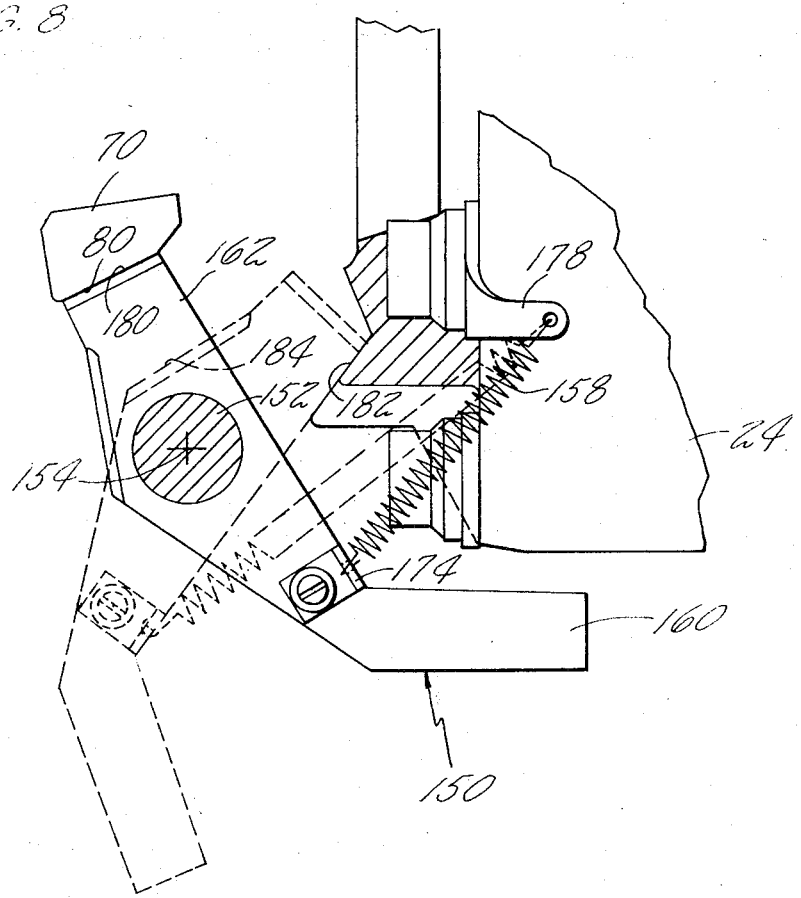
FIGS. 8 and 9 show a modification of the static and dynamic droop stop mechanism corresponding to FIGS. 5 and 6.
Figure 9:
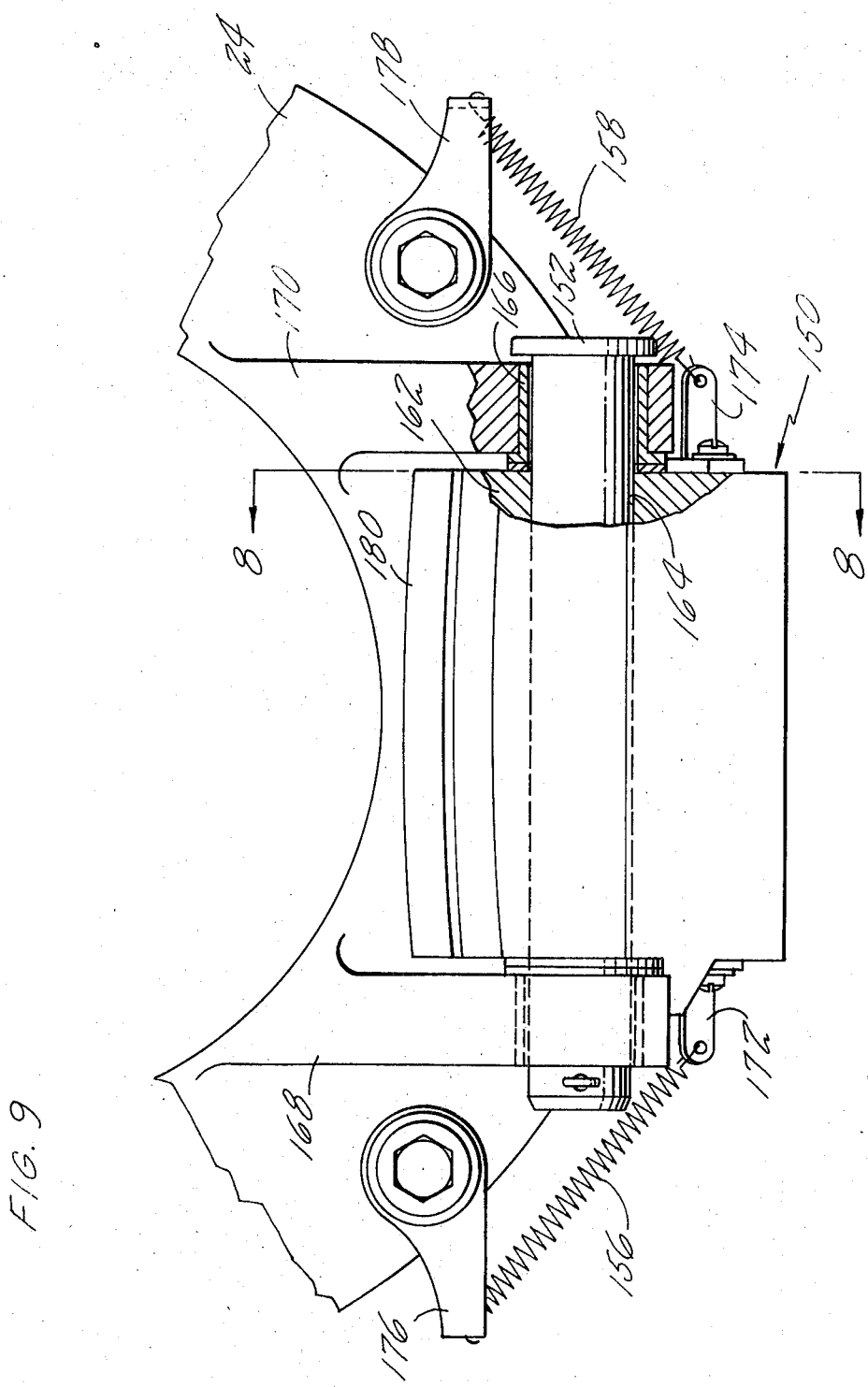

A modified droop stop 150 is shown in FIGS. 8 and 9. Droop stop 150 is also centrifugally operated and is mounted for rotation with pin 152 about axis 154 so that it can move between its static position shown in solid lines in FIG. 8 and its dynamic position shown in phantom in FIG. 8. Springs 156 and 158 bias the droop stop 150 to its static position and centrifugal force, acting upon droop stop counterweight 160 overcomes the biasing force of springs 156 and 158 to pivot the droop stop to its dynamic position.

Cam carrying member 162 of droop stop 150 includes central bore 164 which is press fitted onto pin 152, while the pin passes loosely through bushings, such as 166 at its opposite ends, which are supported in leg members 168 and 170, which project from hub arm 24. Springs 156 and 158 are connected to droop stop 150 through removable attachment means 172 and 174, respectively, and to hub arm 24 by removable attachment means 176 and 178, respectively.

Member 162 carries static conical cam surface 180, which is conical about lead-lag axis 34 and matingly engages conical surface 80 of blade roller ring 70 when the blade is in its low rpm or stopped static position shown in solid lines in FIG. 8. During normal rotor rotation, centrifugal force causes counterweight 160 to move droop stop 150 to its FIG. 8 dotted line position against positive stop surface 182, wherein dynamic conical cam surface 184, which is also conical about lead-lag axis 34, is presented for mating engagement with surface 80 of blade roller ring 70. It will be seen that in the FIG. 8-9 modification, conical surface 80 of blade roller ring 70 engages in line contact either cam surface 180 or 184 of droop stop 150, depending upon whether the droop stop is in its static solid, line FIG. 8 position or its dynamic, phantom line FIG. 8 position and that the blade can move in lead-lag motion or change pitch while roller 70 merely rolls along surface 180 or 184 without scuffing to maintain line-contact therebetween throughout motion. Although of different construction, it will be noted that the droop stop 150 shown in FIGS. 8 and 9 operates in the same fashion as the droop mechanism of FIGS. 5 and 6 previously described.

I wish it to be understood that I do not desire to be limited to the exact details of construction shown and described, for obvious modifications will occur to a person skilled in the art.

I claim:
1. An articulated helicopter rotor including:
A. a rotor hub adapted to be mounted for rotation,

B. at least one helicopter blade projecting substantially radially from said hub and having a pitch change axis, a lead-lag axis and a flapping axis intersecting at a common point, C. means supporting said blade from said hub for universal motion about the intersection of said axes, D. a ring member mounted on said blade for rotation relative thereto about said pitch change axis and at a station radially outward of said point of intersection and having:
  1. a conically shaped surface positioned to move toward said hub as said blade droops downwardly, E. a droop stop member including:
  1. a frame means connected to said hub,
  2. dynamic droop stop means supported by said frame means and having a barrel shaped surface concentric with respect to the lead-lag axis and positioned and shaped to matingly engage said conically shaped surface of said ring member when said blade droops downwardly to a selected first angle, and so that said matingly engaged surfaces will continue in mating engagement without affecting blade pitch or downward droop angle as the blade moves in lead-lag motion about the lead-lag axis, due to the continuous rolling contact between said matingly engaged surfaces of said rotatable ring member and said dynamic droop stop means, 3. static droop stop means loosely pivotable on and supported from said frame means or dynamic droop stop means for movement with respect thereto and including:
   a. a cam member having a conically shaped surface and positionable to matingly engage said conically shaped surface of said ring member when said blade droops downwardly to a second selected angle, and being concentric with respect to the lead-lag axis so that said matingly engaged surfaces of said rotatable ring member and said cam surface remain in mating engagement without affecting blade pitch, blade downward flap or droop angle, and without preventing independent blade pitch change as said blade moves in lead-lag motion about said lead-lag axis, due to the continuous rolling contact established between said matingly engaged surfaces of said ring member and said cam surface,
   b. a barrel shaped surface corresponding in shape to said barrel shaped surface of said dynamic droop stop means,
   c. counterweight means connected to said cam member so that when said blade is operating at low rotational speed or is stopped, said conically shaped surface of said cam member matingly engages the conically shaped surface of said rotatable ring member when said blade and rotatable ring member flap downwardly to said selected first angle so as to, due to the loose pivot connection between said static droop stop means and said frame means, or dynamic droop stop means to thereby cause said barrel shaped surface of said cam member to engage said barrel shaped surface of said dynamic droop stop means in mating engagement so that blade loading is imparted through said static droop stop means and said dynamic droop stop means and said frame means to said hub, and so that when rotor speed increases, said counterweight means will cause said cam member to move in response to centrifugal force from between said conically shaped surfaces of said ring member and said dynamic droop stop means to permit a greater degree of downward blade droop motion to a second selected angle before said conically shaped surfaces of said ring member and said dynamic droop stop means barrel shaped surface matingly engage to impart blade loads through said dynamic droop stop means and said frame means to said hub.

2. A rotor according to claim 1 and including means to bias said static droop stop means to position said cam member between said ring member and said dynamic droop stop means.

3. A rotor according to claim 1 wherein said conically shaped surfaces of said ring member and said static droop stop means are positioned to have apexes located at said common point so as to establish continuous line contact between said conically shaped surfaces as the blade moves in lead-lag motion with said conically shaped surfaces in continuous contact.

4. A rotor according to claim 1 wherein said loose pivotal connection between said static droop means and said dynamic droop stop means is oriented so that when misalignment occurs in said blade-from-hub supporting means, said static droop stop means will pivot with respect to said dynamic droop means to bring said barrel shape surfaces of said dynamic droop stop means and said cam means into mating engagement and to retain said conical surfaces of said ring member and said static droop stop means in line engagement.

5. An articulated helicopter rotor including:
   A. a rotor hub adapted to be mounted for rotation,
   B. at least one helicopter blade projecting substantially radially from said hub and having a pitch change axis, a lead-lag axis and a flapping axis intersecting at a common point,
   C. means supporting said blade from said hub for universal motion about the intersection of said axes,
   D. a ring member mounted on said blade for rotation relative thereto about said pitch change axis and at a station radially outward of said point of intersection and having:
      1. a conically shaped surface positioned to move toward said hub as said blade droops downwardly,
   E. dynamic droop stop means supported from said hub and having a barrel shaped surface concentric with respect to the lead-lag axis and positioned and shaped to matingly engage said conically shaped surface of said ring member when said blade droops downwardly to a selected first angle, and so that said matingly engaged surfaces will continue in mating engagement without affecting blade pitch or downward droop angle as the blade moves in lead-lag motion about the lead-lag axis, due to the continuous rolling contact between said matingly engaged surfaces of said rotatable ring member and said dynamic droop stop means,
   F. a centrifugally responsive member having a conically shaped surface corresponding to said conically shaped surface of said ring member and being pivotally mounted by means of a loose pivot connection with respect to said hub for motion between a first position wherein said pivotally mounted member is positioned between the conically shaped surface of said ring member and said barrel shaped surface of said dynamic droop stop means at low rotor speeds or when the rotor is stopped and oriented so as to present its conically shaped surface to said conically shaped surface of said ring member for mating line engagement therewith when said blade droops downwardly beyond a second selected angle, and a second position remote from said ring member and said dynamic droop stop means.

6. A rotor according to claim 5 wherein said second selected angle is less than said first selected angle.

7. A rotor according to claim 1 wherein said support means includes a spherical elastomeric bearing centered about said common point and having alternate elastomeric and rigid layers.

8. A rotor according to claim 1 wherein said droop stop means barrel shaped surface is shaped in cross section as segments of circles which lie in a substantially horizontal planes concentric about and perpendicular to the lead-lag axis.

9. A rotor according to claim 1 and including a coning limit stop means connected to said hub and having a conically shaped surface positioned to intercept said ring member when said blade flaps or cones upwardly to a selected angle and which surface is shaped to present a corresponding mating surface with said ring member conical surface to effect relative rotation therebetween as said blade moves in lead-lag motion when said surfaces are in line contact, without affecting blade pitch or flapping angle and without preventing independent blade pitch change due to the rolling motion between said ring member and said coning limit stop means.

10. A rotor according to claim 9 wherein said coning limit means conical surface is concentric about and perpendicular to the lead-lag axis and whose apex is located at said common point.

11. A rotor according to claim 1 wherein said selected first angle is greater than said selected second angle.

12. An articulated helicopter rotor including:
   A. a rotor hub adapted to be mounted for rotation,
   B. at least one helicopter blade projecting substantially radially from said hub and having a pitch change axis, a lead-lag axis and a flapping axis intersecting at a common point,
   C. means supporting said blade from said hub for universal motion about the intersection of said axes,
   D. a ring member mounted on said blade for rotation relative thereto about said pitch change axis and at a station radially outward of said point of intersection and having:
      1. a selectively shaped conical surface positioned to move toward said hub as said blade droops downwardly,
   E. droop stop means including:
      1. dynamic droop stop means fixedly connected to said hub and having:
         a. a barrel shaped surface positioned to intercept said conically shaped surface of said ring member when said blade droops downwardly to a first selected angle and which surface is shaped to present a corresponding mating surface with said ring member conically shaped surface to effect relative rotation therebetween as said blade moves in lead-lag motion when said surfaces are in continuous rolling contact,
      2. static droop stop means loosely pivotally connected to said dynamic droop stop means and having:
         a. a conically shaped surface positioned to intercept said conically shaped surface of said ring member when said blade droops downwardly to a second selected angle and which surface is shaped to present a corresponding mating surface with said ring member conically shaped surface to effect relative rotation therebetween as said blade moves in lead-lag motion when said surfaces are in contact,
         b. and a barrel shaped surface corresponding in shape to said barrel shaped surface of said dynamic droop stop means and wherein blade loading against said static droop stop means causes said static droop stop means to move into contact with said dynamic droop stop means with their barrel shaped surfaces in mating surface-to-surface contact to wedge said static droop stop means between said ring member and said static droop stop means and to impart blade loading through said dynamic droop stop means into said hub and including:
            1. centrifugally responsive means to cause said static droop stop selectively shaped surface to move out of alignment with said conically shaped surface of said ring member in responsive to higher rotor speeds.

13. A rotor according to claim 12 and including means to bias said static droop stop means to a position between said ring member and said dynamic droop stop means.

14. A rotor according to claim 12 wherein said conically shaped surface of said ring member and the conically shaped surfaces of said static droop stop means are frustoconical with the apexes thereof positioned at said point of intersection.

15. A rotor according to claim 12 wherein said second selected angle is less than said first selected angle.

16. A rotor according to claim 12 wherein said support means includes a spherical elastomeric bearing centered about said point of intersection and having alternate elastomeric and rigid laminates.

17. A rotor according to claim 12 including means loosely pivotally connecting said static droop stop means to said dynamic droop stop means including:
   A. a pin member supported from said dynamic droop stop means,
   B. a support member connected to said static droop stop means and having apertures therein which are substantially oversized with respect to and through which said pin passes to establish a loose pivotal connection between said pin and said static droop stop means so that blade weight will cause said static droop stop barrel surface to matingly bear against said barrel surface of said dynamic droop stop means in surface contact when said conical surfaces of said ring member and said static droop stop means are in contact to lock said cam member in position and so that blade loading is imparted directly to said hub through said static and dynamic droop stop means with said pin member unloaded, and so that said support member for said static droop stop means will pivot with respect to said dynamic droop stop means when said conical surfaces of said ring member and said static droop stop means are not in line contact so as to bring said conical surfaces into line contact.

18. An articulated helicopter rotor including:
   A. a rotor hub adapted to be mounted for rotation,
   B. at least one helicopter blade projecting substantially radially from said hub and having a pitch change axis, a lead-lag axis and a flapping axis intersecting at a common point, C. means supporting said blade from said hub for universal motion about the intersection of said axes, D. a ring member mounted on said blade for rotation relative thereto about said pitch change axis and at a station radially outward of said point of intersection and having:
  1. a conically shaped surface positioned to move toward said hub as said blade droops downwardly, E. a droop stop means including:
  1. dynamic droop stop member supported by said hub and having a barrel shaped surface concentric with respect to the lead-lag axis and positioned and shaped to matingly engage said conically shaped surface of said ring member when siad blade droops downwardly to a selected first angle, and so that said matingly engaged surfaces will continue in mating engagement without affecting blade pitch or downward droop angle as the blade moves in lead-lag motion about the lead-lag axis, due to the continuous rolling contact between said matingly engaged surfaces of said rotatable ring member and said dynamic droop stop means,
  2. static droop stop means loosely pivotable supported from said hub for movement with respect thereto and incluidng:
     a. a cam member having:
        1. a conically shaped surface positionable to matingly engage said conically shaped surface of said ring member when said blade droops downwardly to a second selected angle, and being concentric with respect to the lead-lag axis so that said matingly engaged surfaces of said rotatable ring member and said cam surface remain in mating engagement without affecting blade pitch, blade downward flap or droop angle, and without preventing independent blade pitch change as said blade moves in lead-lag motion about said lead-lag axis, due to the continuous rolling contact established between said matingly engaged surfaces of said ring member and said cam surface,
        2. a barrel shaped surface corresponding in shape to said barrel shaped surface of said dynamic droop stop means,
     b. counterweight means connected to said cam member so that when said blade is operating at low rotational speed or is stopped, said conically shaped surface of said cam member matingly engages the conically shaped surface of said rotatable ring member when said blade and rotatable ring member flap downwardly to said selected first angle so as to, and, due to the loose pivot connection between said static droop stop means and said hub, said barrel shaped surface of said cam member engages said barrel shaped surface of said dynamic droop stop means in mating engagement so that blade loading is imparted through said static droop stop means and said dynamic droop stop means to said hub, and so that when rotor speed increases, said counterweight means will cause said cam member to move in response to centrifugal force from between said conically shaped surfaces of said ring member and said dynamic droop stop means to permit a greater degree of downward blade droop motion to a second selected angle before said conically shaped surfaces of said ring member and said dynamic droop stop member barrel shaped surface matingly engage to impart blade loads through said dynamic droop stop means to said hub.

19. A rotor according to claim 18 wherein said loose pivotal connection between said static droop means and said hub is oriented so that when misalignment occurs between said conical surfaces of said ring member and said static droop stop means, said static droop stop means will pivot with respect to said dynamic droop means to bring said barrel shape surfaces of said dynamic droop stop means and said cam means into mating engagement and to return said conical surfaces of said ring member and said static droop stop means into line engagement.

20. A rotor according to claim 18 wherein said barrel shaped surface of said dynamic droop stop member is shaped so that sections taken therethrough perpendicular to the lead-lag axis form segments of circles concentric to the lead-lag axis.

21. A rotor according to claim 18 including means loosely pivotally connecting said static droop stop means to said hub including:
  A. a pin member supported from said hub,
  B. a support member connected to said cam member and to said counterweight means and having apertures therein between said cam member and said counterweight means which are substantially oversized with respect to and through which said pin passes to establish a loose pivotal connection between said pin and said support member of said static droop stop means so that blade weight will cause said static droop stop cam barrel surface to matingly bear against said barrel surface of said dynamic droop stop means in surface contact when said conical surfaces of said ring member and said static droop stop means are in contact to lock said cam member in position and so that blade loading is imparted directly to said hub through said static and dynamic droop stop means with said pin member unloaded, and so that said support member of said static droop stop means will pivot with respect to said dynamic droop stop means when said conical surfaces of said ring member and said static droop stop means are not in line contact so as to bring said conical surfaces into line contact.

22. A rotor according to claim 1 including means loosely pivotally connecting said static droop stop means to said frame means or dynamic droop stop means including:
  A. a pin member supported from said frame means or said dynamic droop stop means,
  B. a support member connected to said cam member and to a counterweight means and having apertures therein between said cam member and said counterweight means which are substantially oversized with respect to and through which said pin passes to establish a loose pivotal connection between said pin and said support member of said static droop stop means so that blade weight will cause said static droop stop cam barrel surface to matingly bear against said barrel surface of said dynamic droop stop means in surface contact when said conical surfaces of said ring member and said static droop stop means are in contact to lock said cam member in position and so that blade loading is imparted directly to said hub through said static and dynamic droop stop means with said pin member unloaded, and so that said support member of said static droop stop means will pivot with respect to said dynamic droop stop means when said conical surfaces of said ring member and said static droop stop means are not in line contact so as to bring said conical surfaces into line contact.

23. A rotor according to claim 12 wherein said barrel shaped surface of said dynamic droop stop means is shaped so that sections taken therethrough perpendicular to the lead-lag axis form segments of circles concentric to the lead-lag axis.

24. A rotor according to claim 12 wherein said barrel shaped surface of said dynamic droop stop means is oriented and shaped to define circular segments concentric to the lead-lag axis when parallel planes are passed therethrough perpendicular to the lead-lag axis, and wherein said conical surfaces of said ring member and said static droop stop means have apexes positioned at said common point so that line rolling contact takes place between said conical surfaces when said ring member bears against said static droop stop member and so that surface contact takes place between said barrel shaped surfaces of said static drop stop means and said dynamic droop stop means to lock said static droop stop means in position when said static droop stop means is positioned between said ring member and said dynamic droop stop means and blade weight is bearing thereagainst.

25. An articulated helicopter rotor including:
A. a rotor hub adapted to be mounted for rotation,
B. at least one helicopter blade projecting substantially radially from said hub and having a pitch change axis, a lead-lag axis and a flapping axis intersecting at a common point,
C. means supporting said blade from said hub for universal motion about the intersection of said axes,
D. a ring member mounted on said blade for rotation relative thereto about said pitch change axis and at a station radially outward of said point of intersection and having:
  1. a conically shaped surface positioned to move toward said hub as said blade droops downwardly,
E. a droop stop member pivotally supported from said hub and responsive to the centrifugal force generated by rotor rotation to be actuatable between a static and a dynamic position and having:
  1. a first cam surface shaped to be conical with respect to said lead-lag axis when said droop stop member is in said static position and positioned to engage said conically shaped surface of said ring member in line contact when said blade droops to a first selected angle, and so that said conical surfaces remain in line contact while permitting pitch change and lead-lag motion of the blade,
  2. a second cam surface shaped to be conical with respect to the lead-lag axis when said droop stop member is in said dynamic position and positioned to contact the conically shaped surface of said ring member in line contact when said blade droops to a second selected angle and so that said conical surfaces remain in line contact while permitting pitch change and lead-lag motion of the blade, and
  3. means to bias said droop stop member to said static position.

26. A rotor according to claim 25 wherein said second selected angle is larger than said first selected angle.

27. A rotor according to claim 25 wherein said support means includes a spherical elastomeric bearing centered about said common point and having alternate elastomeric and rigid layers.

28. A rotor according to claim 25 and including stop means to stop said droop stop member in its dynamic position.

29. A rotor according to claim 25 and including a coning limit stop means connected to said hub and having a conically shaped surface positioned to intercept said ring member when said blade flaps or cones upwardly to a selected angle and which surface is shaped to present a corresponding mating surface with said ring member conical surface to effect relative rotation therebetween as said blade moves in lead-lag motion when said surfaces are in line contact, without affecting blade pitch or flapping angle and without preventing independent blade pitch change due to the rolling motion between said ring member and said coning limit stop means.

30. A rotor according to claim 29 wherein said coning limit means conical surface is concentric about and perpendicular to the lead-lag axis and whose apex is located at said common point.

* * * * *

UNITED STATES PATENT OFFICE
CERTIFICATE OF CORRECTION

PATENT NO. : 3,853,426
DATED : December 10, 1974
INVENTOR(S) : ROBERT C. RYBICKI It is certified that error appears in the above-identified patent and that said Letters Patent are hereby corrected as shown below:

Column 2, line 5 : "flat" should read --conical--

Column 2, line 20: "flat" should read --Prior art--

Column 2, line 20: Make "Prior art pad designs..." a new paragraph.

Signed and Sealed this seventh Day of October 1975

[SEAL]

Attest:

RUTH C. MASON
Attesting Officer

C. MARSHALL DANN
Commissioner of Patents and Trademarks